Figure 1:
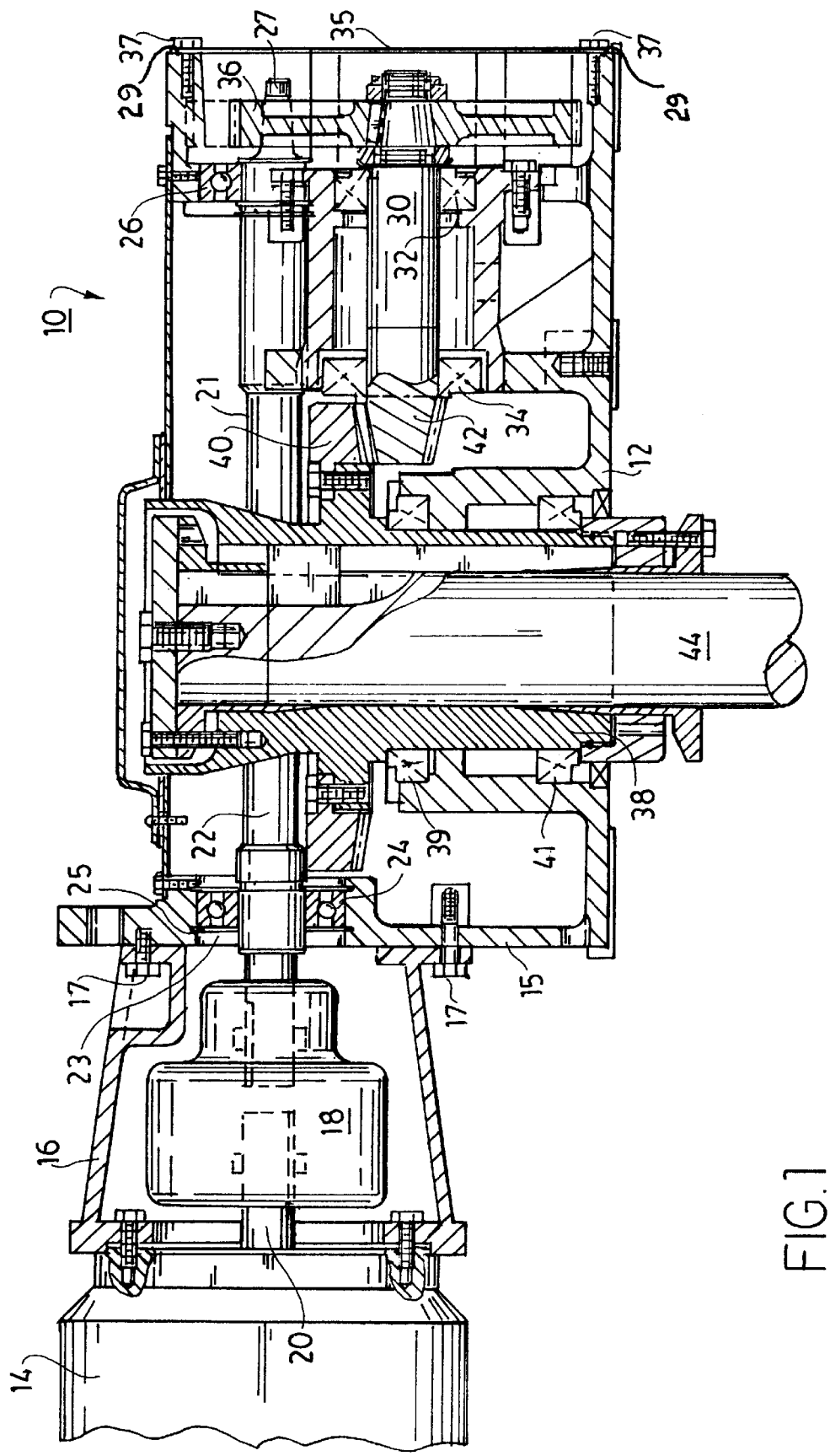

United States Patent

Hutchings et al.

[11] Patent Number: 5,842,377
[45] Date of Patent: Dec. 1, 1998

[54] MIXER GEARBOX ASSEMBLY HAVING A CROSS-SHAFT ALTERNATIVELY MOUNTED IN ONE OR TWO BEARINGS AND CONFIGURED TO RECEIVE DIFFERENT DRIVE MOTORS

[75] Inventors: William J. Hutchings, Fairport; Stephen L. Markle, Holley; David J. Engel, Springwater; Joel S. Berg, Hilton; Marlin D. Schutte, Rochester, all of N.Y.

[73] Assignee: General Signal Corporation, Rochester, N.Y.

[21] Appl. No.: 739,738

[22] Filed: Nov. 7, 1996

[51] Int. Cl.⁶ .................................................. F16H 1/20
[52] U.S. Cl. ...................... 74/420; 74/606 R; 74/421 A
[58] Field of Search ................................ 74/420, 421 A, 74/606 R, 661, 413, 417

[56] References Cited

U.S. PATENT DOCUMENTS

| | | | |
|---|---|---|---|
| 2,354,987 | 1/1944 | Fawkes | 74/625 |
| 2,441,446 | 5/1948 | Schmitter | 74/421 A |
| 3,148,556 | 9/1964 | Gibbs et al. | 74/606 X |
| 3,434,366 | 3/1969 | Raso et al. | 74/421 A |
| 3,796,108 | 3/1974 | Kime et al. | 74/417 |
| 4,198,373 | 4/1980 | Kropp et al. | |
| 4,811,616 | 3/1989 | Henderson | 74/421 A |
| 5,195,623 | 3/1993 | Sommer | 74/661 X |
| 5,501,117 | 3/1996 | Mensing et al. | |

*Primary Examiner*—Rodney H. Bonck
*Assistant Examiner*—Ankur Parekh
*Attorney, Agent, or Firm*—M. Lukacher

[57] ABSTRACT

A mixer gearbox assembly for driving a mixer shaft capable of receiving either a complete electric drive motor on a first face of the gearbox housing for operatively coupling with a first end of a long cross-shaft in the housing, or alternatively a partial electric drive motor on a second face of the gearbox housing for operatively coupling with an opposite end of the cross-shaft. In an alternative configuration for use with only a partial motor, an assembly containing otherwise identical components is provided with a short cross-shaft replacing the long cross-shaft, which short shaft is supported by a single bearing and is colinearly matable only at the outer end thereof with the drive shaft of a partial electric motor. The rotor and short shaft act as a unitary structure when assembled. The alternative configuration can reduce the cost of manufacture of the gearbox assembly through elimination of a motor bearing, a shaft bearing, and a long cross-shaft, and also this configuration eliminates the usual motor pedestal and its coupling, and through use of all other parts identical with those of the alternative-motor assembly.

4 Claims, 2 Drawing Sheets

MIXER GEARBOX ASSEMBLY HAVING A CROSS-SHAFT ALTERNATIVELY MOUNTED IN ONE OR TWO BEARINGS AND CONFIGURED TO RECEIVE DIFFERENT DRIVE MOTORS

DESCRIPTION

The present invention relates to apparatus for driving a mixer shaft, more particularly to gearbox apparatus for operatively connecting an electric motor to a mixer shaft, and most particularly to such gearbox apparatus wherein either of two types of electric motors can be connected alternatively at two different dedicated positions on a single gearbox.

Typically, a drive assembly for turning a mixer shaft uses a rugged cast housing containing a torque transmission including a train of gears mounted on one or more rotatable shafts, which train can transmit torque from the output shaft of an electric motor mounted on the housing to a rotatable quill having an axial bore for receiving and retaining a mixer shaft. The quill may be equipped with and driven by an equatorial ring gear, also known as a bull gear, which is the ultimate gear in the gear train.

The shafts of the gear train may be oriented substantially parallel to the axes of the quill and mixer shaft, the motor being mounted on the top of the gearbox or housing. This layout (known as "vertical") results in a relatively tall drive assembly which can be unsuitable in locations having limited headroom over the mixer.

Alternatively, the shafts of the gear train may be oriented substantially orthogonal to the axes of the quill and mixer shaft, permitting the motor to be mounted on a side of the housing and thus reducing the overall height of the drive assembly (known as "horizontal"), the bull gear and its drive pinion gear being bevel-cut gears. See, for example, U.S. Pat. Nos. 4,198,373 and 5,501,117.

A horizontal drive assembly typically employs a complete electric motor. By "complete" is herein meant a motor having a pair of bearings supporting a drive shaft near or at opposite ends of the shaft within a motor housing, the motor being functionally independent of other apparatus for mechanical completeness. The motor housing may have an integral flange at one end, by which it may be bolted directly to the gearbox or to a standoff from the gearbox, for example, a NEMA C-face motor. Large motors may require instead or additionally a separate pedestal or foot for support to minimize or redistribute loads on the gearbox housing. The motor shaft may be connected to the input shaft of the gear train by any conventional rotary coupling.

The just-described elements for conventionally connecting a standard motor to a gearbox add significant cost and weight to the mixer assembly, neither of which is desirable. In a known alternate configuration, the coupling and standoff can be eliminated, along with one motor bearing and one shaft bearing, by providing a gearbox having a face specially configured to receive a partial motor. A "partial" motor as used herein means a motor having only one shaft bearing at the distal end of the motor shaft and therefore being functionally dependent on mechanical elements of associated apparatus such as the gearbox. In this embodiment, the motor shaft is machined and bolted at its proximal end to mate and be integral with a pinion gear shaft in the gear train, the resulting integral shaft being supported by the distal motor shaft bearing and the pinion gear shaft bearing. This alternate configuration, also known as an integral motor assembly, can reduce substantially the cost and weight of a mixer drive assembly. See, U.S. Pat. No. 3,434,366 issued to Raso on Mar. 25, 1969 and U.S. Pat. No. 4,811,616 issued to Henderson on Mar. 14, 1989.

Currently, the purchaser of a mixer drive assembly must choose between the complete-motor technology and the partial-motor technology because a partial motor may not be substituted directly for a complete motor. For example, a purchaser having a large inventory of standard NEMA motors and spare parts may feel compelled to continue purchasing gearbox assemblies matable only with NEMA motors, and thereby not avail himself of the benefits of the integral-motor configuration. On the other hand, a manufacturer choosing to purchase a new integral-motor assembly may then be committed to carrying an inventory of motors and parts for both configurations for at least an extended transition period, which can be expensive and hence undesirable.

Thus a need exists for an improved mixer gearbox assembly capable of accepting alternatively and with minimal modification either a complete electric motor or a partial electric motor.

It is a principal object of the invention to provide an improved mixer gearbox assembly wherein a single arrangement of shafts and gears may be driven alternatively by either a complete electric motor or a partial electric motor.

It is a further object of the invention to provide an improved mixer gearbox assembly wherein a cross-shaft extending substantially the full width of the housing thereof can mate alternatively with a complete motor drive shaft at one end thereof or with a partial motor drive shaft at the other end thereof.

It is a still further object of the invention to provide an improved mixer gearbox assembly having a housing capable of receiving alternatively a complete electric motor mounting flange on one face of the housing and a partial electric motor mounting flange on a different face of the housing.

It is a still further object of the invention to provide an improved mixer gearbox assembly wherein a motor having only one bearing in the motor housing is connected to a pinion gear shaft having only one bearing in the gearbox.

Briefly described, an improved mixer gearbox assembly in accordance with the invention contains a quill rotatably disposed in quill bearings in a gearcase or housing for receiving and driving a mixer shaft. The housing is provided with a first shaftway transverse of, and not intersecting, the quill, the first shaftway extending through first and second opposite walls of the housing. The first shaftway is provided with first and second bearing mounts within the housing and near the opposite walls, the mounts retaining at least one bearing for rotatably supporting a first cross-shaft having a first pinion gear mounted near an outboard end thereof, adjacent to the second wall of the housing. The housing is also provided with a second shaftway parallel with the first shaftway but intersecting the quill. The second shaftway is provided with bearing mounts for rotatably supporting a second cross-shaft. The second shaft is provided at its outer end with a gear drivingly engaged with the first pinion gear, and at its inner end with a bevel cut pinion gear drivingly engaged with an equatorial ring gear on the quill. The transmission thus is able to drive the quill in double-reduction by the rotation of the first shaft.

The outer surface of the first housing wall surrounding a first end of the first shaftway is provided with features such as lands and threaded bores to permit mounting of a complete electric motor thereto, and the outer surface of a second and opposite housing wall surrounding the second end of the first shaftway is provided with similar features to permit mounting of a partial electric motor thereto.

A long first cross-shaft is provided which is supported by first and second bearings in the housing and extends beyond both bearings. The first end of the shaft extends beyond the housing wall and is configured to be coupled to a standard motor shaft by, for example, a conventional shaft coupling. The opposite end of the cross-shaft is configured to be coupled to a partial motor shaft by, for example, a nesting cone or other known shaft-joining and centering means. When a complete motor is coupled to the first end of the long cross-shaft, the opposite end where it extends beyond the bearings is covered by a first plate. Likewise, when the shaft is joined to a partial motor shaft, a cover is installed over the first end of the shaft. It is a feature of the invention that a cross-shaft in a mixer drive assembly can be connected alternatively to a complete motor drive shaft at a first end and to a partial motor drive shaft at the other end. It is a further feature of the invention that a single housing and gear train can accept alternatively a standard motor and a partial motor.

Alternatively, when the assembly is configured for partial-motor drive, a short first cross-shaft may be provided which extends inwardly of the housing through only one shaft bearing and outwardly through the second housing wall to mate directly with a partial motor, the covering plate having been omitted. The first end of the shaftway, not occupied by a first cross-shaft and bearings in this configuration, is covered by a second cover or a plug. If the end use of the mixer assembly is to be only in combination with an integral partial motor, the assembly may be provided by the manufacturer with only the short first shaft configuration, thus saving the customer significant cost in shaft and bearings.

Figure 2:
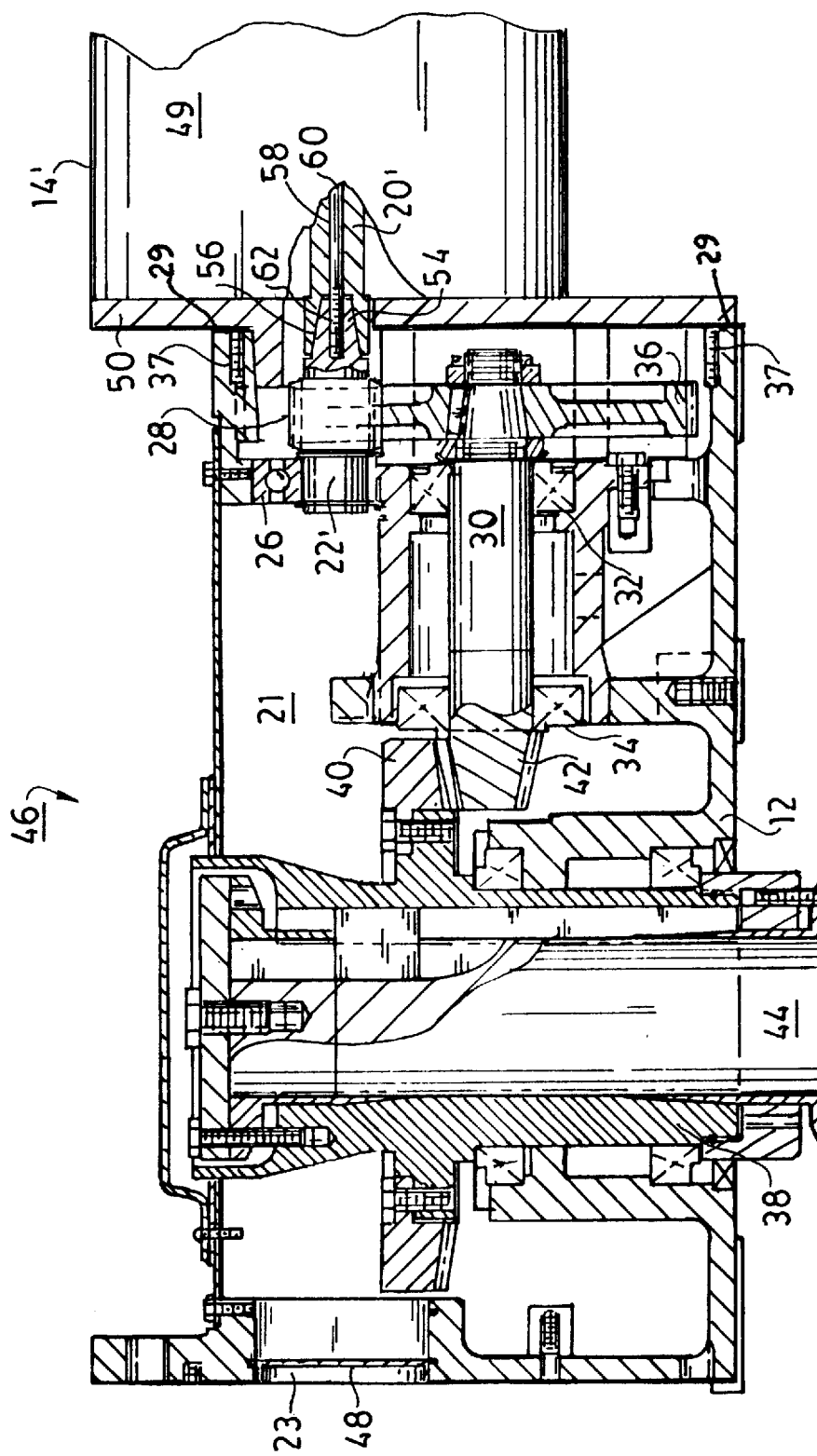

The foregoing and other objects, features, and advantages of the invention, as well as a presently preferred embodiment thereof, will become more apparent from a reading of the following description in connection with the accompanying drawings in which:

FIG. 1 is an elevational view, partially in cross-section, of a first configuration of a mixer drive assembly in accordance with the invention, showing a standard electric motor mounted via a stand-off to a first wall of the gearbox, the motor shaft being coupled via a coupling to a long first cross-shaft of the assembly; and FIG. 2 is an elevational view like that of FIG. 1, showing a second configuration of a mixer drive assembly in accordance with the invention, wherein a partial-motor is mounted directly to a second wall of the gearbox and the motor shaft is bolted directly to a short first cross-shaft.

Referring to FIG. 1, there is shown a first mixer drive assembly 10 in accordance with the invention, including a gearbox or housing 12 supporting a conventional complete electric motor 14, for example, a NEMA C-face motor, secured to the housing at first face 15 thereof by standoff 16 and bolts 17. A conventional resilient coupling 18 connects motor shaft 20 colinearly with a first cross-shaft 22. Cross-shaft 22 is disposed in a first shaftway 21 and is mounted for rotation in first and second cross-shaft bearings 24 and 26, respectively, and extends through opening 23 in wall 25 of housing 12. Cross-shaft 22 is provided near its end opposite motor 14 with a pinion gear 28 (not visible in FIG. 1) drivable by shaft 22. A second cross-shaft 30 parallel with first cross-shaft 22 is mounted for rotation in indirect bearings 32 and 34, and is fitted at its outer end with a gear 36 which is drivingly engaged by pinion gear 28. "Indirect" refers to the gear's being mounted on an unsupported, cantilevered portion of the shaft outboard of a bearing. The opposite end 27 of shaft 22 is configured to receive alternatively a partial motor shaft in a manner similar to that described for a short cross-shaft hereinbelow in reference to FIG. 2. The outer ends of shafts 22 and 30, and gears 28 and 36, as shown in FIG. 1 are covered by a plate 35 which is sealingly mounted on a second face 29 of housing 12 by bolts 37. Plate 35 forms an end of the gearcase to retain lubricant therein.

A shaft holder comprising a hollow quill 38 is rotatably disposed in upper and lower quill bearings 39 and 41, respectively, within housing 12, the axial orientation of the quill being substantially orthogonal to the axial direction of the first and second cross-shafts. Quill 38 is provided with a bevel-cut equatorial ring gear 40 which meshes in driving relationship with a bevel-cut pinion gear 42 mounted on the inner end of second cross-shaft 30. Thus quill 38 is driveable in double gear reduction by motor 14 to turn mixer shaft 44 which is rigidly retained coaxially within the quill.

Referring to FIG. 2, a second mixer drive assembly 46 in accordance with the invention, provided with an integral partial motor 14', includes many elements identical with those in first assembly 10: housing 12, cross-shaft bearing 26, pinion gear 28, second cross-shaft 30 in bearings 32 and 34, drive gear 36, quill 38, equatorial gear 40, bevel-cut pinion gear 42, and mixer shaft 44. Opening 23 is sealingly closed by a pressed plug 48 to retain lubricant within the gearcase. A short first cross-shaft 22' disposed in first shaftway 21 and supporting pinion gear 28 is journalled only in bearing 26, bearing 24 (in assembly 10) being omitted. Plate 35 is also omitted, and in its place partial motor 14' having a case 49 and integral mounting flange 50 is mounted via bolts 37. Motor 14' is said to be "partial" because it has only a distal bearing (not shown in FIG. 2) for rotationally supporting only the distal end of its motor shaft 20' and thus can be functional only when integrated with a second bearing element 26 in the gearbox. Cross-shaft 22' is provided at the outer end with a male conical portion 54 which is received concentrically within a female conical portion 56 in the end of partial motor shaft 20'. Shaft 20' is provided with an axial bore 58 through its entire length, and binder screw 60 therein is threadably received in a threaded axial bore 62 in the end of cross-shaft 22' to join shaft 22' with shaft 20' as a single, colinear, rotatable unit without resort to a separate, distinct coupling, supported at opposite ends by the partial motor distal shaft bearing and gearbox bearing 26. Of course, other known shaft mating configurations are equally useful within the scope of the invention.

Second drive assembly 46 thus permits a significant lightening of the assembly over first assembly 10; reduction in manufacturing cost by the substitution of a short cross-shaft 22' for a long one 22, and substitution of a partial motor 14' for a complete motor 14 with the elimination of shaft bearing 24 and a proximal motor shaft bearing, plus a conventional motor pedestal and shaft coupling and substantial simplification over the alternative drive assembly 10, all within a common gearbox 12 and otherwise all the same drive elements as recited above. When only an integral partial motor is to be used with the mixer drive assembly, assembly 46 is the preferred embodiment.

From the foregoing description it will be apparent that there has been provided an improved mixer gearbox assembly for alternative drive motors. Variations and modifications of the herein described improved assembly, in accordance with the invention, will undoubtedly suggest themselves to those skilled in this art. Accordingly, the foregoing description should be taken as illustrative and not in a limiting sense.

What is claimed is:

1. A mixer gearbox assembly for driving a mixer shaft, comprising:
   a) a housing configured to mountingly receive, alternatively, a complete electric motor on a first face thereof or a partial electric motor on a second face thereof;
   b) a first cross-shaft disposed in a first shaftway in said housing, said shaftway extending between said first face and said second face, said first cross-shaft having a first end configured to mate with a drive shaft of a complete electric drive motor and a second and opposite end configured to mate with a drive shaft of a partial electric motor;
   c) a first pinion gear disposed on said first cross-shaft;
   d) a second cross-shaft disposed in said housing;
   e) a first drive gear disposed on said second cross-shaft in meshing relationship with said first pinion gear;
   f) a quill rotatably disposed in said housing, for retaining and turning a mixer shaft;
   g) a quill gear disposed on said quill; and
   h) a second pinion gear disposed on said second cross-shaft in meshing relationship with said quill gear.

2. A mixer gearbox assembly for driving a mixer shaft, comprising:
   a) a housing configured to mountingly receive, alternatively, a complete electric motor on a first face thereof or a partial electric motor on a second face thereof;
   b) a first cross-shaft disposed in a first shaftway in said housing, said shaftway extending between said first face and said second face, wherein said first cross-shaft is rotatably mounted in a single bearing within said housing;
   c) a first pinion sear disposed on said first cross-shaft;
   d) a second cross-shaft disposed in said housing;
   e) a first drive gear disposed on said second cross-shaft in meshing relationship with said first pinion gear;
   f) a quill rotatable disposed in said housing, for retaining and turning a mixer shaft;
   g) a quill gear disposed on said quill; and
   h) a second pinion gear disposed on said second cross-shaft in meshing relationship with said quill pear.

3. A mixer gearbox assembly for driving a mixer shaft, comprising:
   a) a housing configured to mountingly receive, alternatively, a complete electric motor on a first face thereof or a partial electric motor on a second face thereof;
   b) a first cross-shaft disposed in a first shaftway in said housing, said shaftway extending between said first face and said second face;
   c) a first pinion gear disposed on said first cross-shaft;
   d) a second cross-shaft disposed in said housing;
   e) a first drive gear disposed on said second cross-shaft in meshing relationship with said first pinion gear;
   f) a quill rotatable disposed in said housing, for retaining and turning a mixer shaft;
   g) a quill gear disposed on said quill; and
   h) a second pinion gear disposed on said second cross-shaft in meshing relationship with said quill gear, wherein said housing can receive, alternatively, a first cross-shaft rotatably mounted in said first shaftway in first and second spaced-apart shaft bearings and a first cross-shaft rotatably mounted in said first shaftway in a single shaft bearing.

4. A mixer gearbox assembly for driving a mixer shaft, comprising:
   a) a housing configured to mountingly receive, alternatively, a complete electric motor on a first face thereof or a partial electric motor on a second face thereof;
   b) a first cross-shaft disposed in a first shaftway in said housing, said shaftway extending between said first face and said second face, said first cross-shaft being provided with a mating portion at an end thereof, which portion is matable with a motor shaft of said partial electric motor;
   c) a first pinion gear disposed on said first cross-shaft;
   d) a second cross-shaft disposed in said housing;
   e) a first drive gear disposed on said second cross-shaft in meshing relationship with said first pinion gear;
   f) a quill rotatably disposed in said housing, for retaining and turning a mixer shaft;
   g) a quill year disposed on said quill; and
   h) a second pinion gear disposed on said second cross-shaft in meshing relationship with said quill gear.

* * * * *